Aug. 8, 1967  YOSHIHIRO IWAI  3,334,848
VIBRATION-PROOF DEVICE FOR SUPPORTING
A CAMERA IN AN AIRPLANE
Filed Dec. 27, 1965  4 Sheets-Sheet 1

INVENTOR
Yoshihiro Iwai

BY Stevens, Davis, Miller & Mosher
ATTORNEYS

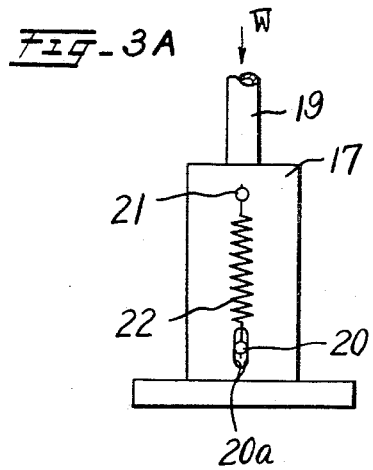
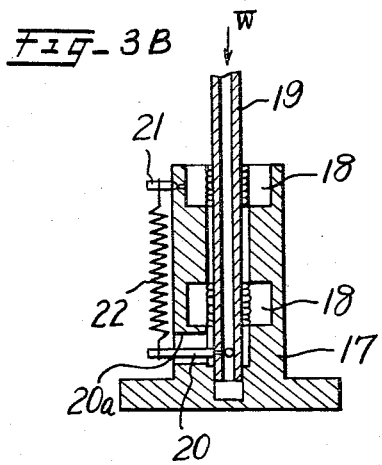
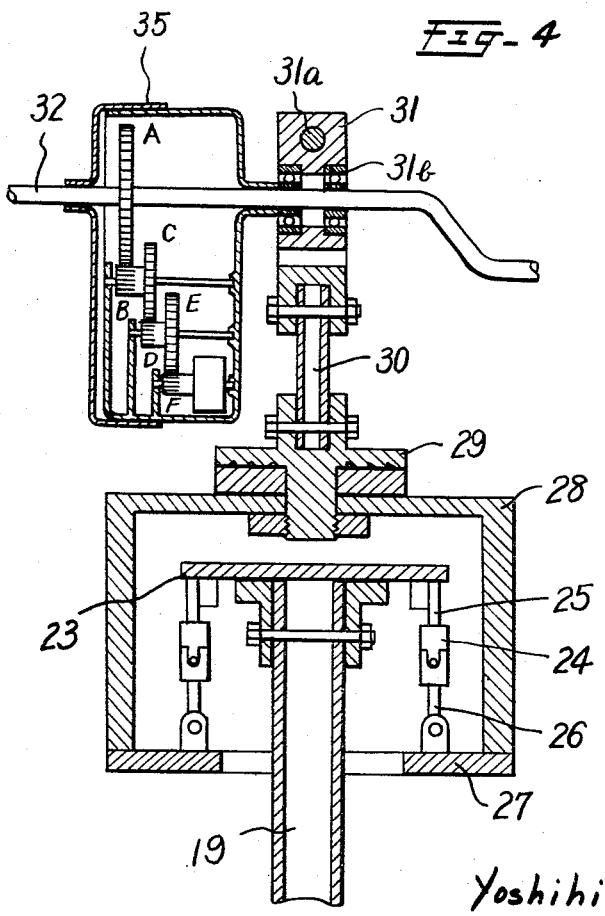

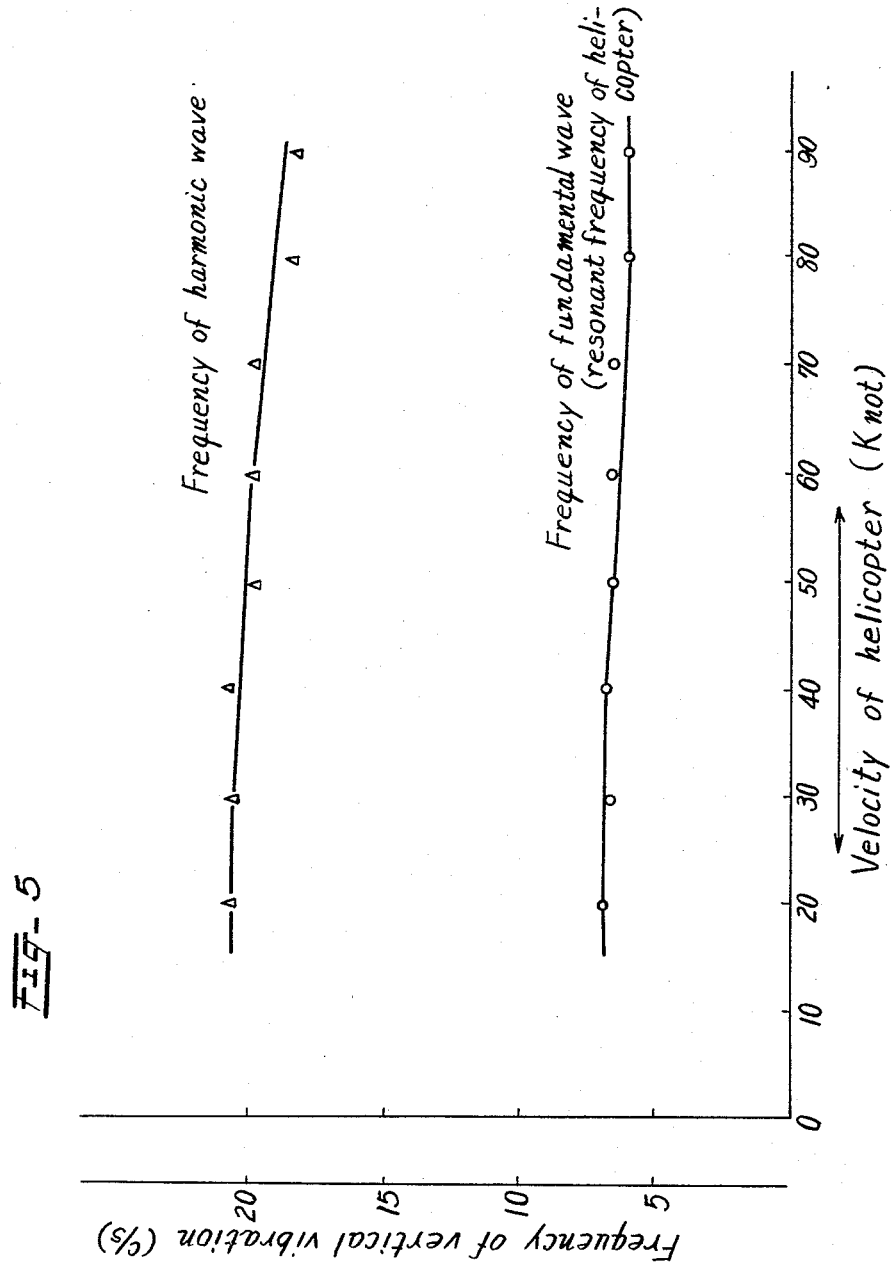

United States Patent Office 3,334,848
Patented Aug. 8, 1967

3,334,848
VIBRATION-PROOF DEVICE FOR SUPPORTING A CAMERA IN AN AIRPLANE
Yoshihiro Iwai, Tokyo, Japan, assignor to Japan Broadcasting Corporation, Tokyo, Japan
Filed Dec. 27, 1965, Ser. No. 516,513
Claims priority, application Japan, Jan. 30, 1965 (utility model), 40/6,465
5 Claims. (Cl. 248—11)

This invention relates to a vibration-proof device for supporting a camera in an airplane, more particularly a device for supporting a camera carried by an airplane, such as a movie camera carried by a helicopter, which prevents the propagation of mechanical vibrations of the airplane or helicopter, such as hovering, rolling, and pitching of the plane during the flight, to the camera.

In order to obtain good pictures, such as movie pictures, from an airplane or a helicopter, it has been believed that the best way is to hold the camera by hands and absorb all vibrations by body. It has been tried recently to use tripod having certain damping means attached thereto in a flying airplane to take pictures therefrom, said damping means being, for instance, rubber dampers for absorbing mechanical vibrations of the plane. With such a tripod equipped with damping means, the degree of absorbing internal vibrations of the airplane itself is limited to a certain level, say 40% at best, and in addition, pitching and rolling of the plane during the flight of the airplane cannot be absorbed at all by such a tripod.

Since there has been no effective mechanical damping device available for damping vibrations of an airplane or a helicopter to a level sufficiently low for obtaining a stable picture from a flying plane, one could not help but allowing a certain degree of vibration in the photographic picture taken from a flying plane.

The principal object of the invention is to provide a vibration-proof device for supporting a camera in an airplane, wherein vertical vibrations are damped by supporting the camera and its accessories through a vertically disposed coiled spring whilst horizontal vibrations are absorbed by placing the camera and its accessories on a pendulum mechanism movable substantially in any direction on a horizontal plane.

In the device of the invention, the camera and a suitable counterbalancing weight members are mounted on a horizontal shaft in a well balanced manner, said horizontal shaft having an upper and a lower horizontal portions connected together by an intermediate stepped portion, said camera being placed on the lower horizontal portion of the shaft so that the axial center line of the upper horizontal portion thereof may pass through the center of gravity of the camera, thereby the camera can be held in a stable manner at whichever angular position it may be tilted. The camera can be revolved around a vertical axial center line passing the fulcrum of the horizontal shaft on which the camera is placed, said vertical axial center line is related to flywheel devices in such a manner that the camera may not be moved in response to a sudden movement of the plane.

Each of aforementioned flywheel devices is provided with a weight member, and said weight member is not secured to said flywheel in a fixed manner but placed on a receiving plate secured to the flywheel so that said weight member may be rotated responsive to rotation of said receiving plate responsive to rotation of flywheel by the friction between the weight and the receiving plate for normal operations. On the other hand, for a large acceleration exceeding a certain predetermined level, such as an acceleration caused by a sudden reversal of the direction in the camera revolution after revolving or panning the camera in a certain direction, the weight member is so arranged to slip on the receiving plate that making the flywheel effect ineffective for such a large acceleration.

For a better understanding of the invention, reference is taken to the accompanying drawings, in which;

FIGS. 3A and 3B are a side view and a vertical sectional view respectively illustrating the mechanism of vertically movable portions of the main shaft;

FIG. 4 is a vertical sectional view illustrating details of the upper portion of the device of FIG. 1;

FIG. 5 illustrates curves representing typical characteristics of mechanical vibration of an airplane as measured on floor of a flying helicopter;

Figure 1:
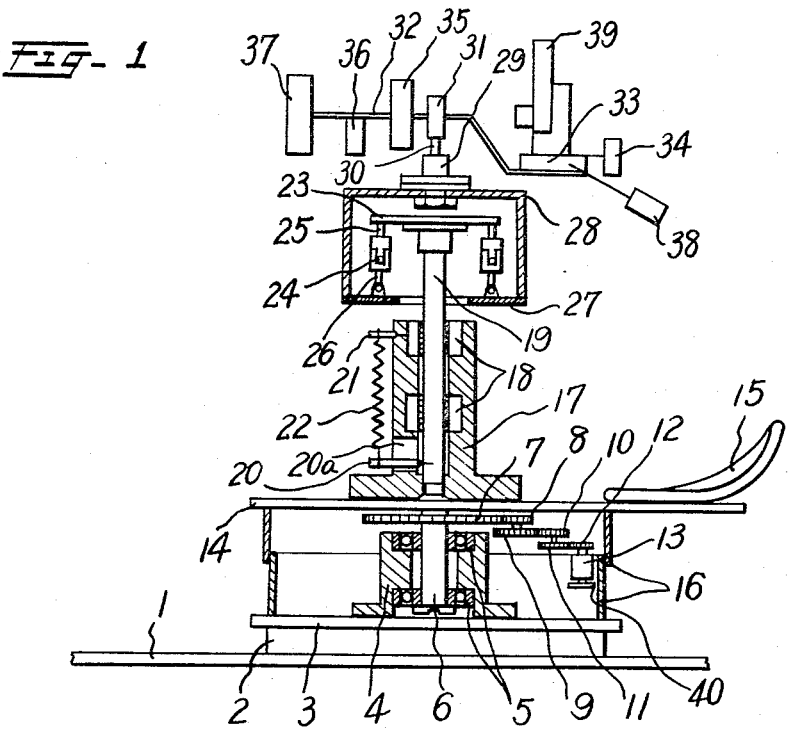
FIG. 1 is a simplified elevation with a part in section illustrating overall construction of a vibration-proof device for supporting a camera embodying the present invention, wherein certain parts of said holding device are not shown for simplicity.

Referring to FIG. 1 illustrating an embodiment of supporting device according to the invention, the reference numeral 1 designates a floor of an airplane, such as a helicopter, 2 a mounting base secured on the floor, 3 a bottom plate of a camera holding device secured to the mounting base 2 by bolts, 4 a bearing holder to hold ball bearings 5 at the central portion of the bottom plate, 6 a vertical shaft rotatably supported by bearings 5, and 7 a gear affixed to the vertical shaft 6 so as to transmit the rotation of the vertical shaft 6 to lower flywheels 13 through gears 8, 9, 10, 11 and 12. The vertical shaft 6 is also secured to the central portion of a generally circular shaped operating floor plate 14 having a cameraman's seat 15 secured at one end thereof. In order to protect the lower flywheels and the gearing between the vertical shaft 6 and the lower flywheels, covers 16 are provided between the bottom plate 3 and the operating floor plate 14.

An upright main shaft holder 17 having plain bearings 18 to hold a main shaft 19 fitted therein is secured vertically to the central portion of the operating floor plate 14 in such a manner that the main shaft holder 17 may be rotated together with the operating floor plate 14 and the vertical shaft 6 as an integral body.

A pin 20 is inserted at the lower portion of the main shaft 19 and another pin 21 is secured at the upper portion of the main shaft holder 17. There is provided a coiled spring 22 to connect the pins 20 and 21 together. The main shaft holder 17 has a notch 20a to allow vertical movement of the pin 21.

An upper plate 23 is secured to the top portion of the main shaft, which is connected to a lower plate 27 through arms 25 hinged to the upper plate 23, universal joints 24, and arms 26 extending from the lower plate 27. Aforementioned universal joints and arms are enclosed in a suspending fixture 28, of which lower end is secured to the lower plate 27.

A rotary supporting means 29 to hold an upper strut 30 is fixed on the suspending fixture 28 in such a manner that the strut 30 may be rotated around the same axial center line as that of the main shaft 19, and a universal joint 31 is placed on the top end of the upper strut. A horizontal supporting shaft 32 to hold a camera 39 is mounted on the universal joint in a horizontally rotatable manner, and a camera head 33 having a zooming handle 34 is secured to the supporting shaft 32. To give flywheel effects to the rotation of the horizontal supporting shaft 32 around its axial center line, a flywheel box 35 is provided as shown in FIG. 1, and a camera handling grip 36 is mounted on the horizontal supporting shaft at a point outside of said flywheel box. A counterbalance weight 37 is mounted at the free end of the horizontal supporting shaft 32 to bring about an overall balance of the camera operating mechanism in the horizontal direction, said counterbalance weight 37 is made adjustable so as to give desired balance of the entire horizontal supporting shaft 32 at the mounting condition of the camera, and another counterbalance weight 38 is mounted at rear side of camera head 33 in order to obtain a stable balance when the camera is tilted around the axial center line of the horizontal shaft 32.

The structure and operation of thus formed camera supporting device of the invention will now be described in detail hereinafter.

The salient features of the invention are as follows:

(1) The vibration generated within airplane itself is absorbed and damped by action of coiled spring 22 secured between pin 20 inserted at lower portion of the main shaft 19 and pin 21 mounted on upper portion of the holder 17.

(2) The horizontal rotary vibration of the vertical shaft 6 supporting the operating floor plate 14 is absorbed by the lower flywheels 13.

(3) Camera vibration due to the movement of the cameraman's hands is eliminated by fixing the cameraman's seat 15 to the operating floor plate 14 so that the cameraman may move together with the camera responsive to horizontal rotation of the camera.

(4) The swaying in the picture due to the hovering motion of an airplane, such as a helicopter, is eliminated by providing a damping mechanism to damp vibration due to eccentric load caused by turning or similar movements of the airplane. In order to damp such vibration effectively, universal joints 24 and arms 25, 26 are provided between the top portion of the main shaft 19 and the upper strut 30 holding the horizontal supporting shaft 32 to support the camera, thereby the camera is held with a certain spacing from the axial center line of the upper strut 30, around which the camera is revolved.

(5) The stability in holding the camera is improved and the camera can be held securely at any desired angular position by holding it in such a manner that its center of gravity is on the axial center line of the upper portion of the horizontal support shaft, as will be described in detail hereinafter, thereby the horizontal revolution around the upper strut 30 and the vertical tilting of the camera can be readily conducted while holding the camera with both hands at the zooming handle 34 and at the camera handling grip 36.

(6) Undesirable vibrations in the direction of tilting camera are eliminated by providing an upper flywheel 35 on the horizontal supporting shaft 32 of the camera.

The supporting device of the invention will now be described in further detail by illustrating operation of each component of the supporting device, i.e. the upper structure, horizontal vibration absorbing mechanism vertical vibration absorbing mechanism and revolving mechanism.

(a) *Upper structure.*—The camera 39 is placed at a suitable position of the horizontal supporting shaft 32 so as to bring about a balance between the camera and the counterbalance weight 37 with respect to the fulcrum at the universal joint 31 of the horizontal shaft 32.

FIG. 4 illustrates construction of the universal joint 31, wherein the horizontal shaft 32 is suspended as a balancing toy with the fulcrum 31a as the center thereof, and the horizontal shaft 32 is so supported as to be rotatable around the longitudinal axial center line thereof on the bearing 31b secured to the universal joint 31.

The horizontal supporting shaft 32 is bent in the proximity of the universal joint 31 in a step like manner as shown in FIG. 4 to provide an upper and a lower horizontal portions. The camera 39 is mounted on thus provided lower horizontal portion of the shaft 32 so that a vertical plane including the horizontal shaft 32 may intersect with the optical axis of the camera at right angles and the center of gravity of the camera may lie on the extension of the upper horizontal portion of the shaft 32. Thus, the camera can be held stably at whatever angular position it may be tilted.

In addition, there is a flywheel device 35 provided on the horizontal shaft 32 in order to prevent undesirable tilting of the camera 39 by small external disturbance.

The universal joint 31 is supported by an upper strut 30 and the lower end of the strut 30 is in turn fitted in the rotary supporting means 29. The rotary supporting means 29 is of the same construction as that of the head portion of ordinary photographic tripod and comprises two disks spaced from each other by inserting fibers and grease therebetween. Thus, the camera can be panned to any direciton freely.

If such a rotary supporting means is fixed to the supporting fixture by means of suitable pins, then the camera can be panned in accordance with the rotation of the operating floor plate 14.

(b) *Device for preventing horizontal swaying motion.*—The upper structure is mounted on the device for preventing horizontal swaying motion. As shown in FIGS. 1 and 4, the device for preventing horizontal swaying motion comprises a suspending fixture 28, a lower plate 27, an upper plate 23, universal joint 24 and unidirectional joints 25 and 26 connecting the upper and lower plates. The suspending fixture 28 is connected to the lower plate 27 as an integral body thereof, and the upper structure is mounted thereon.

Each of the upper plate 23 and the lower plate 27 is provided with four unidirectional joints 25 and 26 respectively, and the movable direction of unidirectional joints 25 on the upper plate is so selected as to intersect at right angles with that of unidirectional joints 26 on the lower plate. Each of the upper unidirectional joints 25 is connected to the corresponding lower unidirectional joint 26 through a universal joint 24, thereby the lower plate 27 is suspended from the upper plate 23. The central portion of the upper plate 23 is secured and supported by the main shaft 19. Thus, the device for preventing horizontal swaying motion functions as a two dimensional pendulum, whereby any horizontal swaying motion of the helicopter is prevented from propagating to the upper structure through the main shaft 19.

Figure 6:
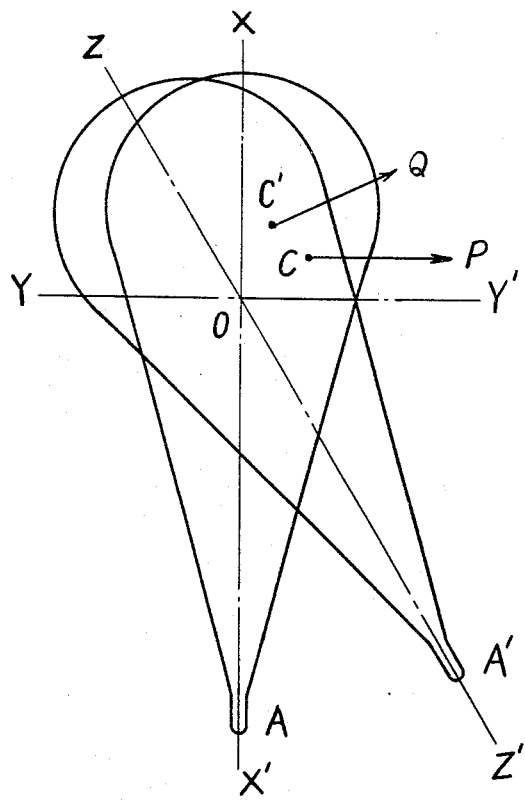
FIG. 6 is a diagrammatic illustration of the effects of hovering motion of a flying helicopter on the camera carried by the helicopter.

As shown in FIG. 6, if the flying helicopter in hovering motion turns its direction between X–X' line and Z–Z' line periodically, the camera on the helicopter changes its position between point C and point C', and turns its direction between arrow P and arrow Q periodically.

In accordance with the aforementioned periodical motion, horizontal swaying motion presents on the picture picked up by camera.

It was ascertained by experiments that the vibration-proof supporting device of the invention was capable of eliminating undesirable effects of such hovering motion completely from the picture taken by using said supporting means.

(c) *A device for absorbing vertical vibrations.*—As illustarted in FIG. 1, there is provided an upright main shaft holder 17 secured on the operating floor plate 14 in order to support the main shaft 19 therein through the plain bearings 18 in a vertically movable manner.

Referring to FIGS. 3A and 3B, there is provided a pin 21 mounted on the upper portion of the holder 17 and a similar pin 20 inserted in the lower end portion of the main shaft 19, and the pins 20 and 21 are connected together by a coiled spring 22. Thus, the main shaft 19 is suspended from the holder 17 by the spring 22, thereby the vertical vibration of the helicopter floor is absorbed in the spring and prevented from propagating to the upper structure.

FIG. 5 illustrates curves representing typical characteristics of vertical vibration of a flying helicopter's floor. The curves shown in FIG. 5 are based on a series of measurements taken on a flying helicopter, wherein the curve shown by series of small circles represents frequency of fundamental wave versus velocity of helicopter, and the curve shown by series of small triangles represents frequency of harmonic wave versus velocity of helicopter.

It is apparent from the aforementioned curves that the frequencies of fundamental and harmonic waves are nearly constant against variation of velocity of the helicopter, and minimum frequency thereof is 6 cycles per second.

In order to absorb such vibration the resonant frequency of spring 22 is set up less than 5 cycles per second.

The table showing the condition of spring which has resonant frequency less than 5 cycles per second is as follows:

| Diameter of wire (cm.) | Diameter of coil (cm.) | Number of turns | Spring constant (kg./cm.) | Deflection (cm.) | Resonant frequency (c./s.) |
|---|---|---|---|---|---|
| 4 | 20 | 28 | 12.14 | 1.97 | 3.57 |
| 4.5 | 20 | 26 | 19.8 | 1.21 | 4.54 |
| 4.5 | 20 | 30 | 17.1 | 1.4 | 4.21 |

Figure 2:
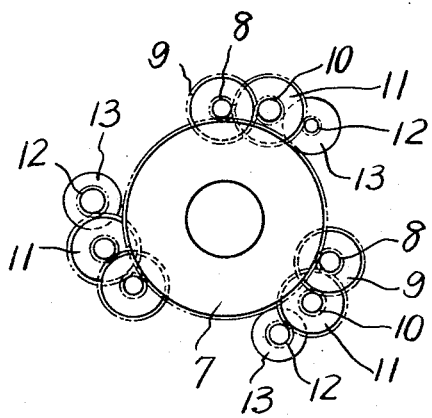
FIG. 2 is a diagrammatic illustration of the layout of lower flywheels.
Figure 7:
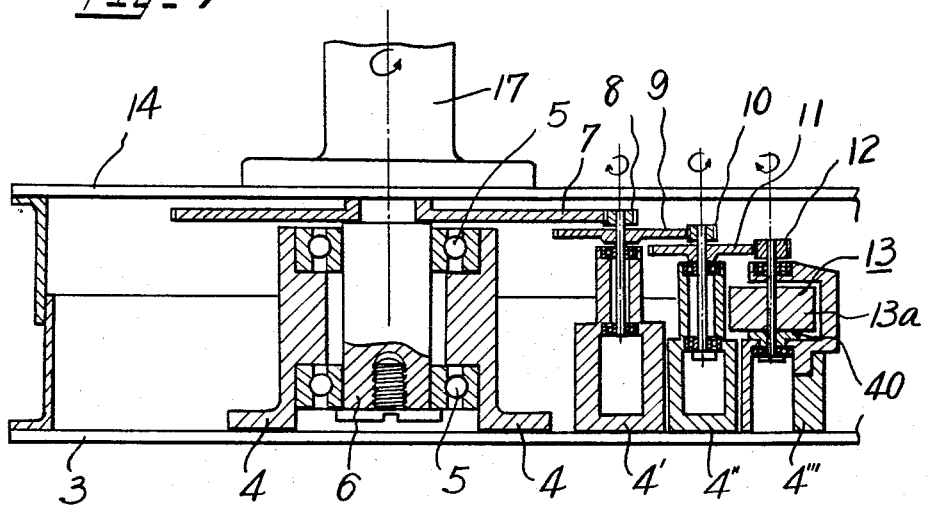
FIG. 7 is a simplified sectional view illustrating construction of a lower flywheel, wherein certain other portions are not shown for clarity.

(d) *Rotating device.*—The operating floor plate 14 is rotatable around the vertical shaft 6, which is located underneath the central portion of the floor plate 14 and supported by ball bearings 5 as illustrated in FIGS. 1 and 7. There is a gear 8 secured on the shaft 6 which is to transmit the rotation of the shaft 6 to a number of lower flywheels 13 through additional gears 9, 10, 11 and 12 as shown in FIG. 2, wherein three lower flywheels are shown in a balanced manner.

In order to "pan" the camera, the cameraman rotates the main shaft 19 together with the operation floor plate 14. Then, the lower flywheels 13 are also rotated to bring about the flywheel effect. Whereby, undesirable revolution of the camera can be eliminated even when a comparatively small external disturbance is applied to the vertical shaft, for example due to sudden movement of the helicopter.

Each lower flywheel 13 is equipped with a weight member 13a, which is not secured directly to the rotary shaft of the flywheel but placed on a disk 40 secured to the lower end portion of said rotary shaft as shown in FIG. 7. The frictional force between said disk 40 and the weight member 13a is so selected that the weight member 13a is rotated together with the disk 40 for normal rotation of the vertical shaft 6, and hence the weight member 13a contributes positively to the flywheel effects for normal rotation of the vertical shaft 6.

On the other hand, if any extra large external force is applied to the vertical shaft 6 or the camera, for instance, if the direction of panning the camera is suddenly reversed at an acceleration exceeding a certain predetermined level immediately following continuous panning in a certain direction, then the weight member 13a, as shown in FIG. 7, slips on said disk 40 secured to the rotary shaft of the flywheel. Thereby, the flywheel effect acting on the camera is substantially reduced when such an extra large external force or acceleration is applied thereto, and hence, for instance, the direction of camera panning can be reversed smoothly and easily.

The vibration-proof device for supporting camera in an airplane according to the invention has a considerably simpler construction than that of conventional devices of the kind, such as known by trade name "helivision" of French make. Thereby the construction cost of the former is substantially lower than that of the latter. Besides, the process of camera handling in the camera supporting device of the invention is much easier than that in conventional devices.

According to the supporting device of the invention, the propagation of the airplane vibration to the camera mounted thereon is prevented by a vibration-proof means comprising a coiled spring, a pair of plain bearings to support a main shaft in cooperation with said coiled spring, a special pendulum mechanism comprising universal and unidirectional joints related to said bearings, a means to facilitate the regulation of the freedom in the direction of panning a camera, a horizontal supporting shaft to hold a camera at a highly stability, and suitably flywheel effect, due to flywheels placed underneath the cameraman's seat, thereby the pictures taken by using the supporting device of the invention is free from vertical vibration and horizontal swaying motion. In fact, it is made possible to use a telescopic lens assembly having a focal length of 120 m. together with a 16 mm. camera in a helicopter by applying the vibration-proof supporting device of the invention.

What I claim is:

1. An apparatus for supporting a camera in an aircraft or the like comprising a main shaft and a main shaft holder, at least one coiled spring coupling said main shaft and holder for damping the aircraft vibrations imparted to the main shaft holder, an operating floor plate supporting said main shaft holder and held by another vertical shaft therebelow, one or more lower flywheels coupled to said other vertical shaft to damp unwanted horizontal rotational vibrations, means including a horizontal shaft above the main shaft comprising upper and lower horizontal portions, for supporting the camera so that the axial center line of said upper horizontal portion of the horizontal shaft passes through the center of gravity of the camera, an means for eliminating horizontal swaying in the picture due to horizontal hovering motion of the airplane including universal joints between the top end of the main shaft and an upper strut holding the upper portion of the horizontal shaft, an upper flywheel mounted on the horizontal support shaft upper portion for preventing vibration of the shaft in the vertical tilting direction of the camera, an upper vibration reducing means including balancing weight members arranged at opposite ends of said horizontal shaft, and a vibration-proof means to prevent undesirable camera movement due to cameraman's motion by permitting rotation of the operating floor plate responsive to horizontal revolution of the camera around the main shaft.

2. An apparatus according to claim 1, in which said coil spring has resonant frequency of less than 5 cycles per second.

3. An apparatus according to claim 1, in which said lower flywheels are located underneath the floor plate and each comprises a weighted disk secured to a rotary shaft, and which shaft is coupled through a gear train to said vertical shaft to respond to the rotation thereof.

4. An apparatus according to claim 1, in which said device for eliminating horizontal swaying motion comprises a fixture suspended from said main shaft by an upper plate disposed on the upper end of the main shaft, a lower plate underlying the fixture, a universal joint, a pair of unidirectional joints connecting said universal joint with said upper and lower plates.

5. An apparatus for supporting a camera in an aircraft or the like comprising an upper support means to support the camera for rotation about a horizontal axis and in a vertical plane through the optical axis of the camera, first means for damping undesirable camera tilt in the said plane in response to small external disturbances imparted thereto by the motion and vibration of the aircraft, a first damping means for damping swaying motion and supporting the upper structure, said first damping means including a vertical strut, a universal joint connected to said strut and coupled to the center of gravity of the upper support means when the camera is mounted thereon whereby the upper structure is rotatable in a plane generally perpendicular to the plane including the camera optical axis, a second damping means for supporting said first damping means for damping vertical vibrations tended to be imparted thereto by said aircraft, and means supporting on the aircraft said second damping means for damped horizontal rotation relative to the floor of the aircraft.

References Cited

UNITED STATES PATENTS

| | | | |
|---|---|---|---|
| 2,717,134 | 9/1955 | Ferber | 248—11 |
| 2,798,686 | 7/1957 | Ehrlich | 248—358 |
| 3,063,343 | 11/1962 | Kaestner | 248—358 X |
| 3,288,419 | 11/1966 | Wallerstein | 248—358 |

JOHN PETO, *Primary Examiner.*